INVENTORS: C.W. HARRISON
R.E. GRAHAM
A.M. DARBIE
BY
Franklin Mohr
ATTORNEY

INVENTORS: C.W. HARRISON
R.E. GRAHAM
A.M. DARBIE
BY Franklin Mohr
ATTORNEY

PROTECTION OF CIRCUIT ELEMENTS

Filed Aug. 18, 1960 5 Sheets-Sheet 3

INVENTORS: C.W.HARRISON
R.E.GRAHAM
A.M.DARBIE
BY
Franklin Mohr
ATTORNEY

PROTECTION OF CIRCUIT ELEMENTS

Filed Aug. 18, 1960 5 Sheets-Sheet 4

INVENTORS: C. W. HARRISON
R. E. GRAHAM
A. M. DARBIE
BY
Franklin Mohr
ATTORNEY

PROTECTION OF CIRCUIT ELEMENTS

Filed Aug. 18, 1960 5 Sheets-Sheet 5

INVENTORS: C.W. HARRISON
R.E. GRAHAM
A.M. DARBIE
BY Franklin Mohr
ATTORNEY

United States Patent Office 3,161,778

Patented Dec. 15, 1964

3,161,778

PROTECTION OF CIRCUIT ELEMENTS

Charles W. Harrison, Millington, Robert E. Graham, Chatham Township, Morris County, and Arthur M. Darbie, South Plainfield, N.J., assignors to Hewlett-Packard Company, Palo Alto, Calif., a corporation of California Filed Aug. 18, 1960, Ser. No. 50,350

10 Claims. (Cl. 307—61)

This invention relates to the protection of circuit elements and more particularly to power regulating systems and to means and methods for protecting such systems from damage by overloading.

Regulating systems such as power supplies may be either of series or shunt type. Such regulators are particularly susceptible to damage by excess current or voltage when an overload or short-circuit occurs at the output terminals of the supply. Since regulators generally comprise either delicate or expensive component elements, it is highly desirable to protect such elements from overload damage or destruction. The following description is concerned chiefly with series regulators; however an embodiment of the invention involving a shunt regulator also is described.

In the systems disclosed and claimed herein, in order to protect the series regulatory element and to obtain high output voltage, especially with transistor circuitry, two separate power supply units are connected with their output circuits in series-aiding relationship and in series with the series regulator to supply the load. The regulating instructions to the series regulator are obtained by sensing the voltage across the load, which is contributed to by the two power supply units. Alternatively, the sensing device may sense the current in the load. Although the series regulator may be described as being associated equally with the two power supply units, for convenience in exposition the combination of the series regulator and one immediately connected power supply unit will be termed a series regulated combination or series regulated supply. The power supply unit thus associated with the series regulator will preferably be the one of lower voltage. The other power supply unit may be in itself unregulated or partially regulated but will subsequently often be referred to as the unregulated power supply unit. A protective unidirectionally conductive element such as a semiconductor diode is connected across the output of the series regulated supply but in such direction or polarity as to render the protective element normally non-conductive. It is desirable for the series regulated supply to be able to change its voltage rapidly, in order to compensate for changes in the unregulated supply voltage. For this reason, no ripple-reducing capacitor is employed directly across the output of the series regulated supply. Ripple-reducing capacitors may, however, be provided, one at the immediate output of the low voltage power supply unit ahead of the series regulator, another across the output of the second power supply unit, and another across the load terminals. Under overload conditions, the relatively unregulated unit renders the protective device highly conductive substantially instantaneously, so that the protective device diverts substantially the full overload current from the series regulator until such time as a fuse or other relatively slowly acting protective device can act to break the circuit or to reduce the supply voltages to safe values. The small proportion of the overload current that flows through the series regulator can be arbitrarily determined and set to a safe value. A relatively inexpensive protector such as a semiconductor diode used in this manner is effective to protect one or more series regulators such as transistors, which regulating elements may be among the most costly parts of the power supply system.

The voltage of the power supply unit that is series regulated may be chosen with respect to the characteristic properties of the series regulator to insure that the series regulator is capable of withstanding the full voltage of this power supply unit. Accordingly, in the overload condition or otherwise, if the unidirectionally conductive protective device becomes conductive, throwing substantially the full voltage of the regulated unit across the series regulator, the latter is able safely to withstand the voltage impressed upon it, either indefinitely or at least until a fuse or other slowly acting protective device has had time to act.

A feature of the invention is automatic or semi-automatic means for varying the voltage output of at least one of the power supply units to conform with changes in the demanded load voltage in order to insure operation of the series regulated unit within a specified normal operating range. In one embodiment of the invention, a variable resistor which is employed to set the value of load voltage desired is mechanically ganged with the means for varying the voltage output of the unregulated unit. When the load voltage setting is changed, the voltage ouput of the unregulated unit is changed correspondingly, in the same direction. In another embodiment of the invention, the voltage drop across the series regulator is sensed and the resulting signal is used to actuate a motor or other device for controlling the means for varying the voltage output of the unregulated unit. The control may be designed to maintain substantially constant the voltage drop in the series regulator. The control is relatively slowly acting compared with the operation of the series regulator, sudden changes being rapidly compensated by the series regulator, followed by a relatively slow readjustment of the output voltage of the unregulated supply unit to bring the series regulator back to its normal condition ready for the next demand for either an increase or a decrease of power to the load.

Another feature is the location of a fuse or other relatively slowly acting protective device in such a position in the system that, under overload conditions, the relatively fast acting unidirectionally conductive protective device substantially isolates the series regulated unit from the unregulated unit while the overload current is substantially confined to a part of the circuit containing the fuse or other device and the unregulated unit. During the period of time required to actuate the slowly acting protective device, the series regulated circuit, thus isolated, is subjected to no excessive current or voltage.

Another feature is a bridge type or balancing circuit for setting or controlling the value of desired load voltage or load current with respect to a reference source. The reference source and a voltage representing the desired load condition are serially connected in one branch path. A fixed resistor and a variable resistor are serially connected in another branch path. By means of the variable resistor, the ratio of the load-representing voltage to the reference voltage may be determined, this voltage ratio, when the circuit is balanced, being the same as the ratio of the resistance values of the resistors. A transistor may be employed to sense unbalance in the circuit and to actuate the series regulator to restore the balance.

Certain embodiments of the invention possess the advantage that the variable element employed to set the output of the supply may be placed at a location remote from the supply.

The systems disclosed have the further advantage that variations of power line voltage are compensated along with variations from any other cause which results in a departure of the load voltage or current from the preset value, since the regulating effect is called into play whenever the voltage sensed in the load circuit departs from a predetermined ratio to the voltage of the standard reference source, irrespective of line conditions.

Other objects, features and advantages will appear from the following more detailed description of illustrative embodiments of the invention, which will now be given in conjunction with the accompanying drawings.

Figure 1:
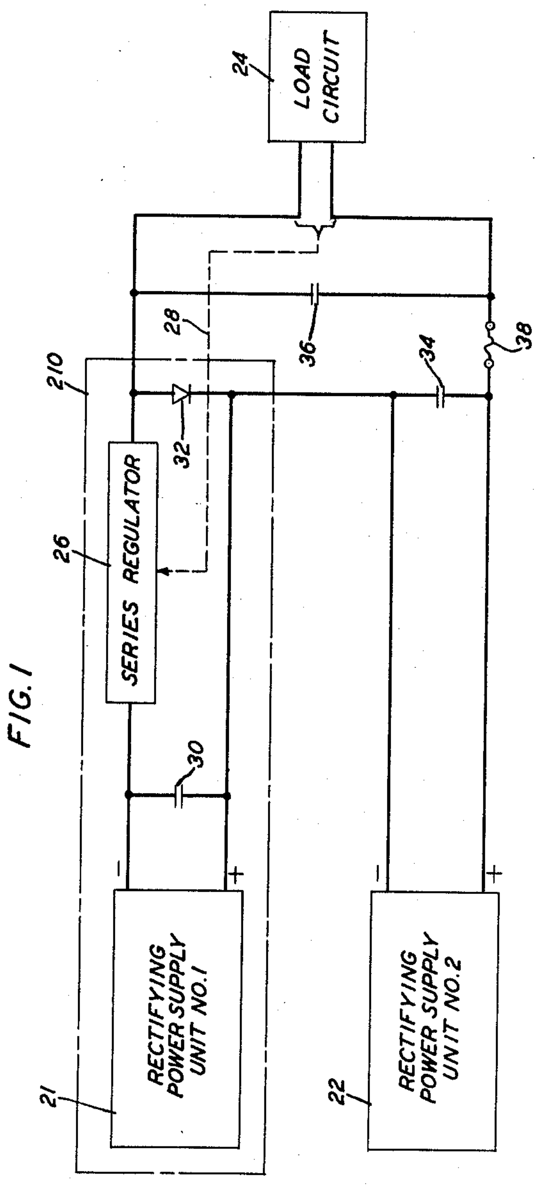
FIG. 1 is a block schematic diagram of a preferred embodiment of the invention.

Referring to FIG. 1, two separate rectifying power supply units 21 and 22 are shown in series aiding relationship with each other and with a load circuit 24. A series regulator 26 is provided for the power supply 21. The regulator 26 may be sensitive to changes in the voltage across the load and act to maintain this voltage substantially constant. The control circuit for this purpose is represented schematically in the figure by a dotted line 28. A ripple-reducing capacitor 30 for the output of the unregulated portion of the power supply 21 may be placed as shown in the figure, between the output of the unit 21 and the series regulator 26. However, the combination 210 of the unit 21 and the series regulator 26, preferably should not be terminated by any appreciable ripple-reducing capacitance, but should be terminated by a unidirectionally conductive protective element 32, as shown, such as a rectifier or a semiconductor diode connected in parallel with the output terminals of the combination. The element 32 is poled in opposition to the output voltage of the power supply unit 21, so that normally no current can flow through the element 32. In other words, in the normal operation of the circuit, the output voltage of unit 21 tends to maintain the diode 32 in the non-conductive state.

A ripple-reducing capacitor 34 is provided across the output of the second power supply unit 22 and a ripple-reducing capacitor 36 is connected across the combination of the serially connected power supply units, that is, across the ultimate regulated output terminals.

A current-overload protective device 38 such as a fuse is connected serially with the load circuit between the lower terminals of the capacitors 34 and 36.

Figure 3:
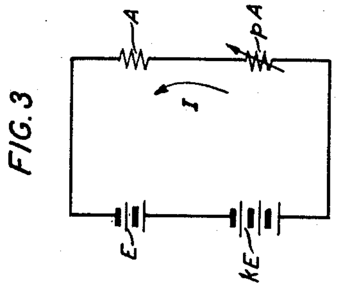
FIGS. 2 and 3 are simplified circuit diagrams useful in explaining the operation of the protective element in a system such as that shown in FIG. 1.

In case of a short circuit across the load circuit or excessive load current, the system of FIG. 1 operates to protect the series regulator 26 in a manner which will now be described with reference to the simplified schematic diagrams shown in FIGS. 2 and 3.

Figure 2:
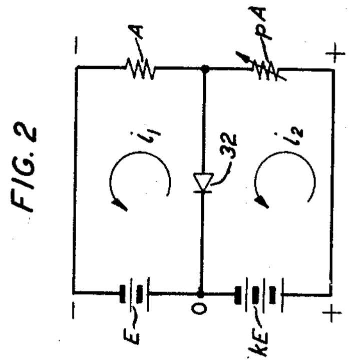

FIG. 2 shows the system of FIG. 1 approximately represented in the form of an equivalent bridge circuit in which E and A are the open-circuit voltage and series resistance respectively of the series combination of power supply unit 21 and series regulator 26, and $k$E and $p$A are the open-circuit voltage and series resistance respectively of the series combination of power supply unit 22 and load circuit 24. The protective diode 32 is seen to lie in one diagonal of the bridge circuit. If $k$ and $p$ are equal, the bridge is balanced and there is no potential difference between the terminals of the diode 32. If $p$ is less than $k$, the diode 32 becomes conductive, thereby effectively isolating E and A from $k$E and $p$A. In this case, the current through A and the voltage across A depend only upon E regardless of the value of $k$. If then, the element of resistance A is designed to withstand the full voltage E, the diode 32 will protect the element from overload. If $p$ is greater than $k$, the diode becomes non-conductive, placing the two open-circuit voltages E and $k$E in series with the two series resistances A and $p$A as shown in FIG. 3. The resultant current I is then seen to be less than the limiting current which the element A is designed to withstand. Thus, whether $p$ is greater than, less than or equal to $k$, the element A is protected. The above remarks hold true irrespective of the value of $k$, which may have any value, less than unity, equal to or greater than unity, depending upon the ratio of the open-circuit voltages of the sources 21 and 22. Since the element A must be designed to absorb the full voltage E, it is preferable that $k$ be greater than unity in order to minimize the power dissipation in element A; that is, for a given total required voltage $(1+k)E$, it is preferable to keep E small by marking $k$ large.

Figure 4:
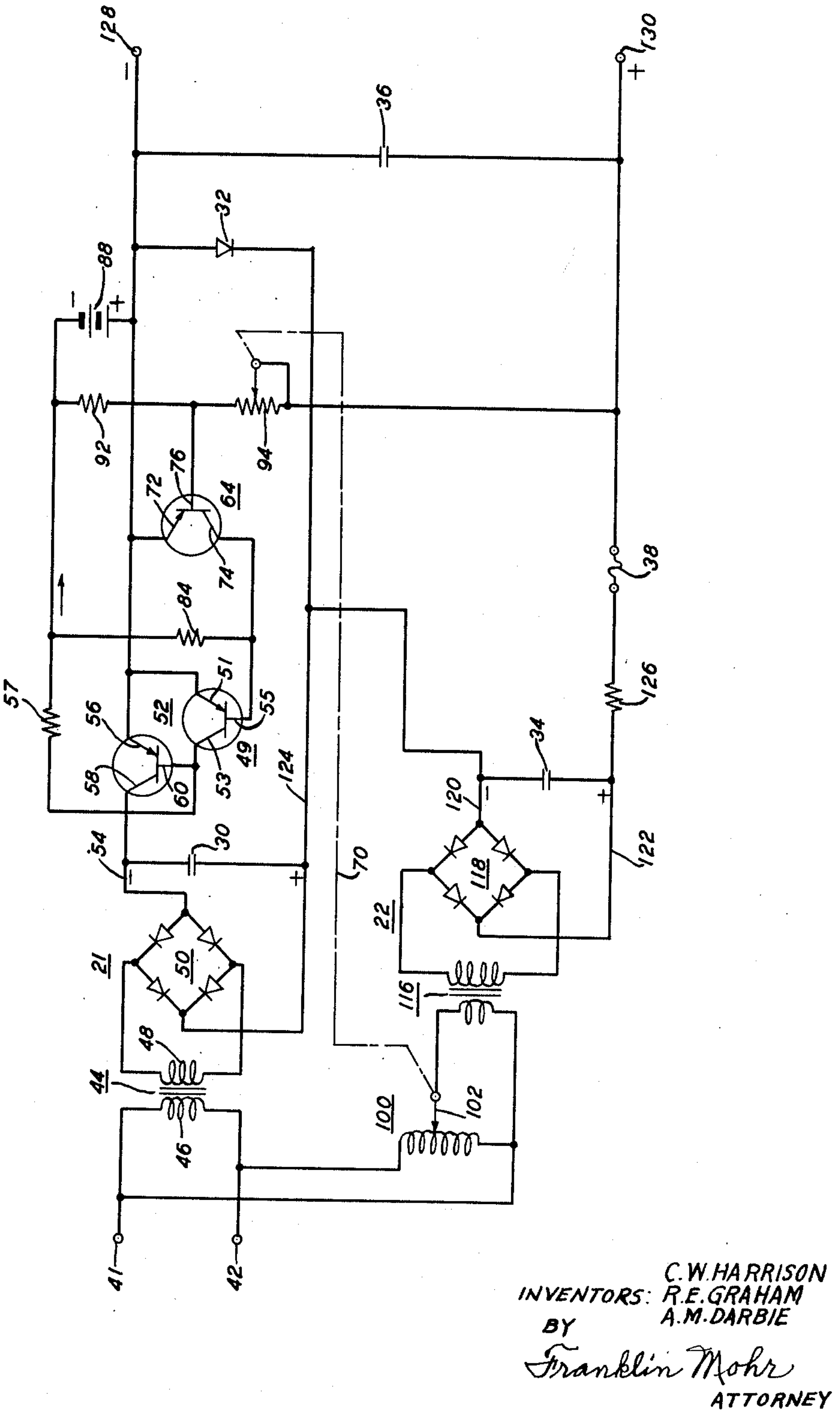
FIG. 4 is a schematic diagram showing illustrative details of a system such as that shown in FIG. 1.

Illustrative details of a system such as is shown in block form in FIG. 1 are given in FIG. 4. Input terminals 41 and 42 are shown from which a single phase alternating current supply may be parallel connected to rectifying power supply units 21 and 22. An input transformer 44, usually of step-down voltage ratio, having a primary winding 46 and a secondary winding 48 may be inserted between the terminals 41, 42 and a rectifier 50 such as a bridge-type full-wave rectifying circuit in the unit 21. In known manner, the secondary winding 48 may be connected across one diagonal of the bridge of rectifier 50 and the ripple-reducing capacitor 30 may be connected across the other diagonal of the bridge. The rectifiers are shown so poled as to make the lower terminal of capacitor 30 the positive terminal.

The series regulator 26 shown in FIG. 1 may comprise a transistor 52, for example of the PNP type as shown in FIG. 4, with its emitter-collector circuit connected serially in the negative load line 54 of the unit 21. The electrodes of the transistor 52 comprise the emitter 56, collector 58 and base 60. The control system or feedback circuit 28 for the transistor 52 includes other transistors 49 and 64, transistor 49 having emitter 51, collector 53 and base 55, and transistor 64 having emitter 72, collector 74 and base 76. The collector 74 of transistor 64 is connected directly to the base 55 of transistor 49 and the collector 53 of transistor 49 is connected directly to the base 60 of transistor 52.

For actuating the transistor 64 and hence in turn the transistors 49 and 52, a voltage-sensing bridge circuit is provided, comprising a source 88 of reference voltage, such as a battery, in series with the voltage across the load, forming one side of the bridge, and a fixed resistor 92 and a variable resistor 94 in series forming the other side of the bridge. The common terminal of the source 88 and the load is connected to the emitter 56 of transistor 52 and to the emitter 72 of transistor 64, this common terminal forming one end of the bridge diagonal. The other end of the bridge diagonal, comprising the common terminal of the resistors 92 and 94 is connected to the base 76 of transistor 64.

The emitters 51, 56 and 72 are parallel-connected to the positive terminal of the source 88, and the collectors 53 and 74 are connected to the negative terminal of the source 88 through the respective resistors 57 and 84.

The rectifier power supply unit 22 may be supplied from the input terminals 41, 42, through an autotransformer 100 of adjustable output voltage, such an autotransformer being available on the market under the name Variac.

The out put of the autotransformer 100 may be connected in known manner as through a transformer 116 and a bridge-type full-wave rectifier 118 to the negative load line 120 and positive load line 122 of the unit 22.

The negative terminal 128 of the load is connected to the negative load line 54 of unit 21 by way of the transistor 52. The positive load line 124 of unit 21 is serially connected to the negative load line 120 of unit 22 and the positive load line 122 of unit 22 is serially connected through fuse 38 and a current-reducing protective resistor 126 to the positive terminal 130 of the load. The ripple-reducing capacitors 30, 34 and 36 and the protective diode 32 are shown in FIG. 4 in the respective positions corresponding to the showing of these elements in FIG. 1.

The moveable arm 102 of the autotransformer 100 and the movable arm of the variable resistor 94 may be mechanically ganged together as upon a common shaft as indicated schematically by a dotted line 70, in order that adjustments of the load voltage, made by changing the resistance value of the resistor 94, are accompanied by appropriate changes in the output voltage of the autotransformer. That is, the load voltage to which it is desired that the system shall be regulated is selected by turning the control shaft of the resistor 94 to the desired position, the autotransformer being simultaneously turned to the proper setting to conform to the value of load voltage selected.

The transistor 52 produces in its emitter-collector circuit a voltage drop of variable amount which subtracts from the output voltage available to the load from the unit 21. The resultant output voltage appears across the protective diode 32 and adds to the output voltage of the unit 22, the sum of these voltages being impressed upon the load. In general, the series regulator 26 as exemplified by the transistor 52 varies its voltage drop under the control of the control circuit 28 in such manner as to maintain the voltage across the load substantially constant despite changes in load or despite voltage variations in the outputs of either or both of the supply units 21 and 22 or of the power line from which units 21 and 22 are supplied.

Adjustments of voltage drop in the series transistor 52 are accomplished by varying the current drawn from the base 60 of the transistor 52. This current is controlled in turn by varying the emitter-collector current of the transistor 49, thereby varying the voltage between the emitter and base of the transistor 52. The emitter-collector current of the transistor 49 is controlled by varying the emitter-collector current of the transistor 64 by means of a bridge circuit comprising the resistors 92 and 94 and the voltage of the reference standard 88 and the voltage across the load terminals. The emitter 72 is connected to the junction of the positive terminal of the standard 88 and the negative terminal of the load, while the base 76 is connected to the common terminal of resistors 92 and 94. If, due to any change in voltage across the load, the voltage ratio between the standard and the load departs from the ratio of the resistance values of the resistors 92 and 94, a potential difference is generated between the emitter 72 and the base 76. Normally, a very slight emitter-base voltage will result in the correct adjustment of the potential drop in the transistor 52 to bring the load voltage to the desired value as determined by the resistance ratio selected by setting the value of the variable resistor 94.

When equilibrium has been established, if the load voltage should increase, the potential at the junction of resistors 92 and 94 is raised, thereby raising the base potential of transistor 64 relative to its emitter potential and decreasing the current flow in transistor 64. This decreased flow increases the voltage drop across the emitter-collector circuit of transistor 64 and consequently increases the voltage between the emitter 51 and base 55 of transistor 49, increasing the emitter-collector current of this transistor, decreasing the voltage drop therein, and decreasing the voltage between the emitter and base of transistor 52, thereby increasing the voltage drop in transistor 52 and decreasing the voltage at the load. Should the load voltage decrease, the action of the transistors is reversed, resulting in an increase in the emitter-collector current in transistor 52 and increasing the voltage impressed upon the load.

In an illustrative case, let it be assumed that the output voltage is 100 volts, and full load current 1 ampere, and the minimum or no load current is 50 milliamperes. The output terminal 130 will be assumed to be at plus 100 volts potential, making the potential zero at terminal 128, to which latter potential all voltages will now be referred. It will be further assumed that the reference voltage of element 88 is 10 volts, and that the beta factor of each transistor is 100. Then, to sustain 1 ampere of current through transistor 52, it is necessary to draw 10 milliamperes of base current from the transistor. It will be further assumed that 10 milliamperes emitter-collector current in transistor 49 produces the voltage drop between the emitter and base of transistor 52 necessary to draw the desired 10 milliampere emitter-base current in transistor 52. This condition requires in turn that 0.1 milliampere emitter-base current be drawn from transistor 49. Assume further that 1 milliampere emitter-collector current in transistor 64 produces the voltage drop between the emitter and base of transistor 49 necessary to draw the desired 0.1 milliampere emitter-base current in transistor 49. This condition requires in turn that 0.01 milliampere emitter-base current be drawn from transistor 64.

In the case of a 50 miliampere load current, the currents in the transistors may have the following values in the illustrative case being considered. The transistor 52 has emitter-collector current of 50 milliamperes and emitter-base current of 0.5 milliampere. The transistor 49 has emitter-collector current of nearly 20 milliamperes and emitter-base current of 0.2 milliampere. The transistor 64 has emitter-collector current of 0.9 milliampere and emitter-base current of 0.009 miliampere.

In the full load condition, the resistor 57 carries 10 milliamperes current from the emitter-base circuit of transistor 52 and 10 milliamperes emitter-collector current from transistor 49, for a total of 20 milliamperes. The resistor 84 carries 0.1 millampere emitter-base current from transistor 49 and 1.0 milliampere emitter-collector current from transistor 65, for a total of 1.1 milliamperes.

In the minimum load condition, the resistor 57 carries a total of 20 milliamperes and the resistor 84 a total of 1.1 milliamperes as will be seen from the current values previously given.

For a load voltage of 100 volts, the total voltage across resistors 92 and 94 is 110 volts and the potential at the junction of resistors 92 and 94, which is also the potential at the base 76, is whatever is required to be applied to the base 76 relative to its emitter to allow one milliampere to flow in the collector circuit. This value of base potential will typically be approximately minus 0.3 volt. In this case, the voltage drop across resistor 92 is 9.7 volts. If it is elected to draw a reference current of 5 milliamperes in the resistor 92, the value required for the resistance of resistor 92 is 1940 ohms. Assuming the same current of 5 milliamperes in resistor 94, to obtain a voltage drop of 100 volts in this resistor requires that the resistance be 20,060 ohms. In practice, the 0.3 volt emitter-base voltage of transistor 64 plays little part in setting the output voltage in that it is small compared to the output voltage of 100 volts. Either resistor 94 or resistor 92 may be adjusted until 100 volts is measured at the load terminals, letting the emitter-base voltage fall where it may. In this example, it is assumed that the voltage across the capacitor 30 to 30 volts—that 15 volts be dropped in the emitter-collector path of transistor 52—and the required voltage supplied across the capacitor 34 is 85 volts.

Figure 5:
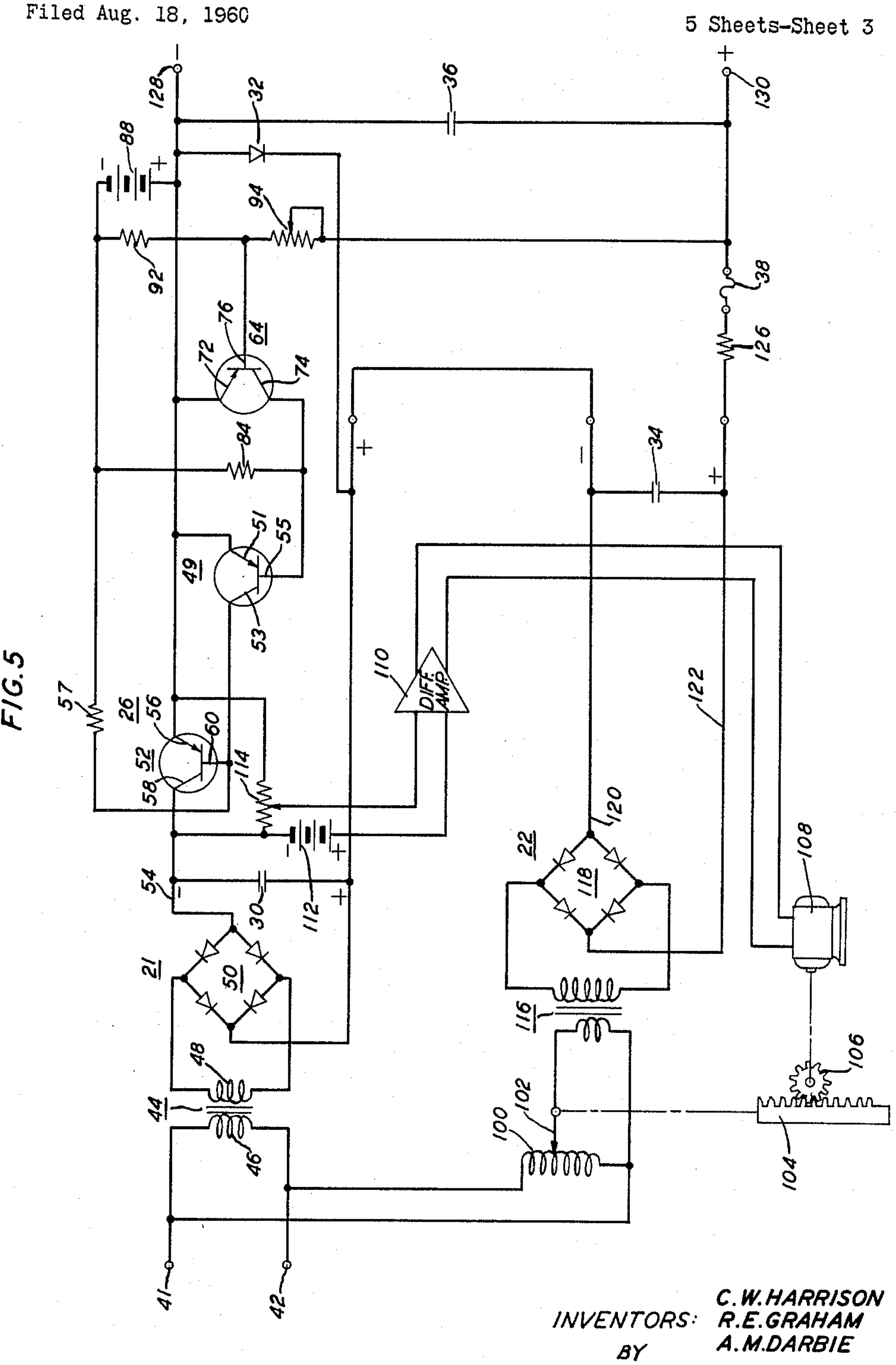
FIG. 5 is a schematic diagram of a system similar to that shown in FIG. 4 but having an alternative arrangement for effecting an automatic adjustment of the voltage of one of the power supply units.

In the arrangement shown in FIG. 5, the setting of the autotransformer 100 is controlled in response to changes in voltage across the series regulator 26 and is not ganged with the variable resistor 94 as in FIG. 4. The movable arm 102 of the autotransformer is arranged to be driven mechanically through a rack 104 and pinion 106 by means of a suitable reversible motor 108. The motor may be controlled by a suitable differential amplifier 110 which is in turn controlled by voltage differences which may arise between a source 112 of reference voltage, such as a battery, and a voltage existing across a portion of a potentiometer 114 connected across the emitter-collector circuit of the series transistor 52. In other respects the system shown in FIG. 5 is similar to the one shown in FIG. 4.

By meanss of the above described control arrangement, the average voltage drop in the series transistor 52 may be maintained approximately constant.

When a demand for a change of supply voltage occurs, the series transistor 52 adjusts very rapidly to meet the demand. The relatively slowly acting control of the autotransformer setting then follows up by adjusting the input voltage of the supply unit 22 so as to restore the voltage drop across the transistor 52 to its normal value, ready to handle the next demand. Thus, whether successive demands call for increasing voltage or decreasing voltage, the transistor 52 is ready adjust in either direction to the full extent of its operating range.

When it is desired to select a new value of regulated load voltage, a change is made accordingly, as in the setting of the resistor 94. This change disturbs the balance of the circuit comprising resistors 92 and 94 and the reference and load voltages in exactly the same way as does a departure of the load voltage from the regulated value, causing a compensatory change in the voltage drop across the transistor 52. The latter change is sensed by the differential amplifier 110 which responds by running the motor 108 to reset the autotransformer to a new equilibrium position such that the voltage drop in the transistor 52 is restored to its normal value.

Inasmuch as the load voltage is the sum of the voltages supplied by the two power supply units diminished by the voltage drop in the series regulator, it will be evident that in an alternative arrangement autotransformer 100 may be placed between the input terminals 41, 42 and the input transformer 44 to provide slow regulation of the output voltage of the power supply unit 21. As another alternative, there may be motor-driven autotransformers or other regulating means such as silicon controlled rectifiers in the input circuits of either or both of the units 21, 22, each controlled by the output of the differential amplifier 110.

As an illustrative example of suitable voltage values which may be assigned to the units 21, 22 and 52, suppose it is desired that the load voltage may have any selected value in the range from 0 to 320 volts. The nominal value of the output voltage of the unit 21 may be assigned as 70 volts, for example, and the transistor 52 may be controlled to maintain an average voltage drop of 35 volts, for example. To take care of rapid fluctuations in load demand, the voltage drop across the transistor may be assumed to vary between limits of 0 and 70 volts, so that the regulated output voltage of unit 21 may vary between 70 volts and 0, being brought to a normal value of 35 volts between fluctuations by the slower acting adjustment of unit 22. Suppose now by way of specific example, the regulator is set for a load voltage of 160 volts and the regulator is then reset by means of resistor 94 for 130 volts. Before the change occurs, the transistor 52 is dropping the output voltage which unit 21 supplies to the load from 70 volts down to 35 volts. The change calls for a further drop of 30 volts in the transistor 52 to which the transistor control responds by dropping 65 volts in the transistor. The unit 22, which may have a maximum potential of 250 volts, is initially supplying 125 volts to the load. The slowly acting control on unit 22 now proceeds to decrease the output voltage of unit 22 gradually to 95 volts, during which change the fast acting transistor control follows, reducing the drop in the transistor gradually from 65 volts to the normal value of 35 volts. When this latter adjustment has been completed, the unit 21 is supplying a net of 35 volts to the load and the unit 22 is supplying the remaining 95 volts to make up the required 130 volts across the load as determined by the new setting of the resistor 94.

Should load conidtions change so that, for example, a smaller proportion of the supply voltages is applied to the load, the balance is disturbed and the system responds by reducing the voltage drop across the transistor 52. The differential amplifier 110 responds by increasing the output voltage of the autotransformer correspondingly. When equilibrium is restored, the voltage drop in transistor 52 has been restored to normal and the output voltage of the autotransformer has been adjusted to supply the increased voltage necessary to restore the load voltage to the regulated value.

Whenever load or power line conditions change or for any reason a regulating action of transistor 52 occurs, the action takes place very rapidly, followed by the slower readjustment of unit 22 in the amount necessary to restore the voltage drop in transistor 52 to its normal value.

Figure 6:
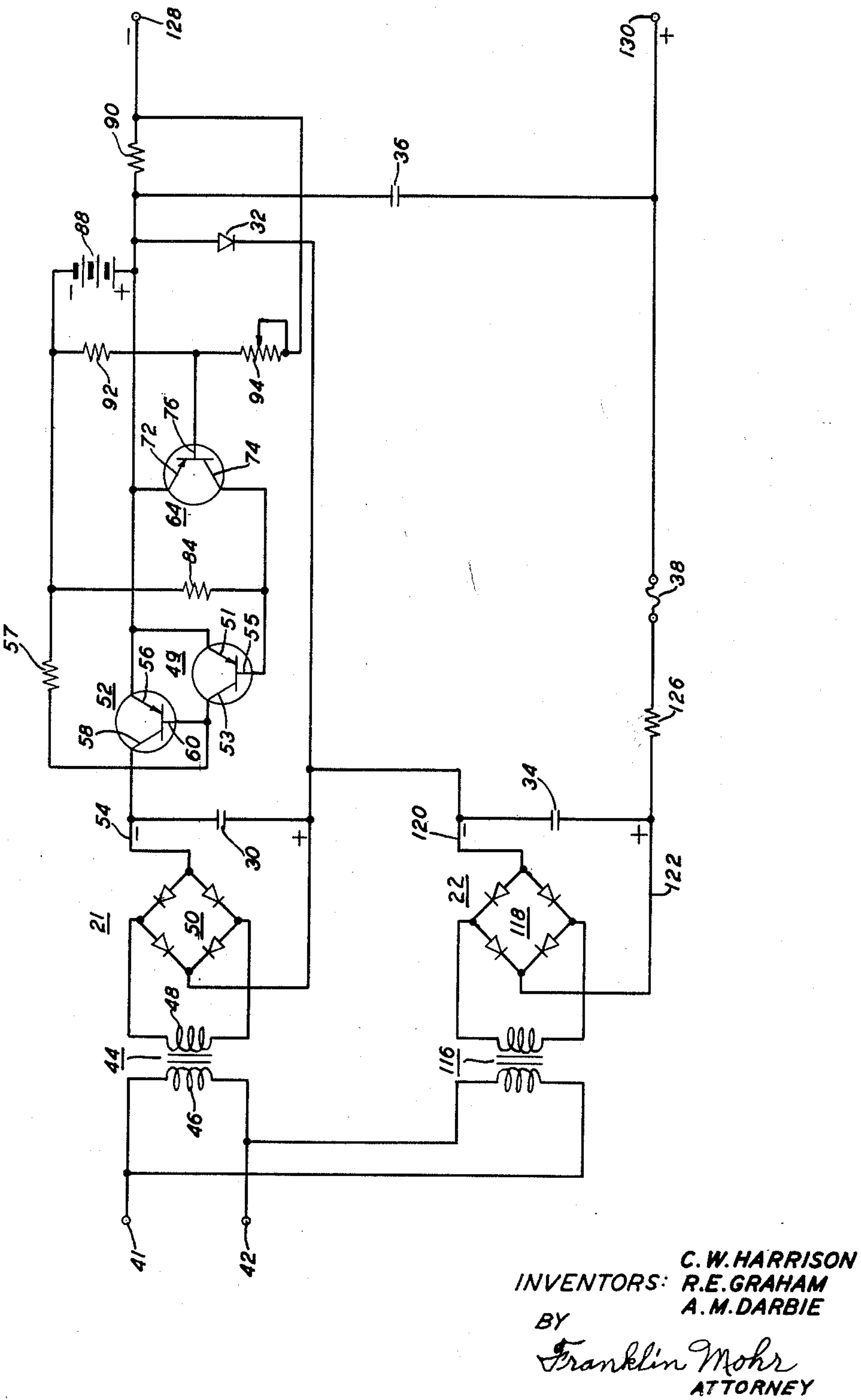
FIG. 6 is a schematic diagram of a control system in which the feedback circuit is sensitive to current changes in the load as distinguished from voltage changes as contemplated in the arrangements of the preceding figures.

In the arrangement shown in FIG. 6, the voltage drop across the transistor 52 is controlled in response to changes in the load current instead of changes in load voltage as is the case in the systems above described. For clarity, no adjustment of the input voltage of power supply unit 22 is shown in this figure, it being understood that the arrangements of FIG. 4 or FIG. 5 or any other suitable arrangement may be used for this purpose and may be incorporated into the arrangement shown in FIG. 6.

In order to sense the load current, the control circuit of the systems of FIGS. 4 and 5 is modified. Instead of including the load in one bridge arm, a resistor 90 in series with the load is used as one bridge arm in place of the entire load. The bridge circuit thus formed is balanced when the voltage of source 88 bears the same ratio to the voltage drop in resistor 90 as resistor 92 bears to resistor 94. As before, the value of resistor 94 may be adjusted to give the desired load condition, determined in this circuit by the value of current through the resistor 90.

In other respects the system shown in FIG. 6 is similar to those shown in FIGS. 4 and 5.

Figure 7:
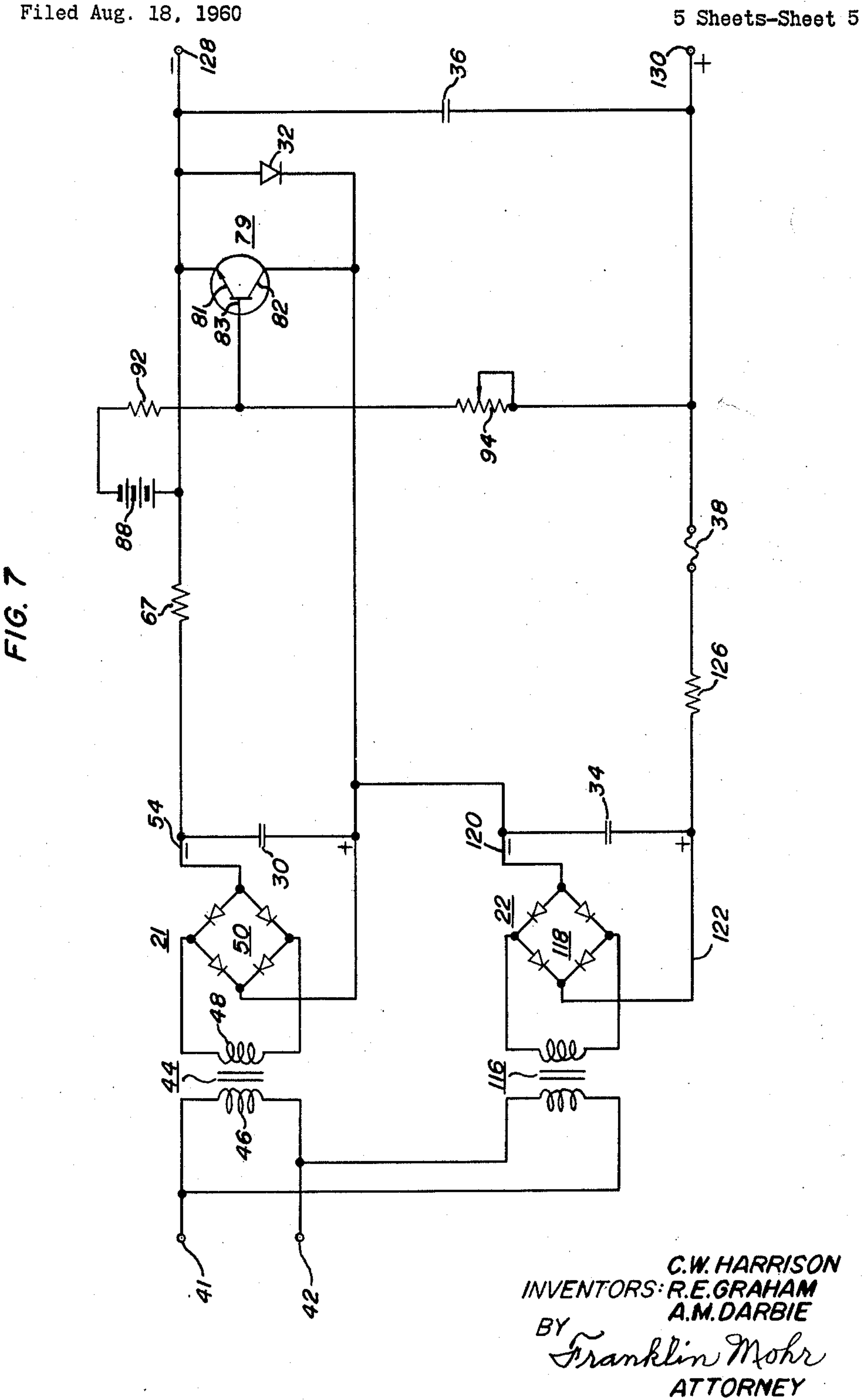
FIG. 7 is a schematic diagram similar to that shown in FIG. 1 but having a shunt type regulator instead of a series type regulator.

In the arrangement shown in FIG. 7, a shunt regulating transistor is used in place of the series regulating transistor shown in previous figures. Thus shunt regulating transistor 79 is shown as being of the NPN type and is controlled in response to changes in the load voltage and acts to maintain this voltage substantially constant. For clarity, no adjustment of the input voltage of power supply unit 22 is shown in this figure, it being understood that the arrangements of FIG. 4 or FIG. 5 or any other suitable arrangement may be used for this purpose and may be incorporated into the arrangement shown in FIG. 7. The transistor 79 produces in its emitter-collector circuit a current flow of variable amount which flows through a resistor 67 producing a proportionate voltage drop in resistor 67. This voltage drop across resistor 67 in turn subtracts from the sum of the voltages across the two rectifying power supply units 21 and 22 to yield the load terminal voltage. Whenever load or power line conditions change, a resulting change in the potential from the emitter 81 to the base 83 of transistor 79 occurs, causing the current flow through this transistor to vary in such a manner as to adjust the voltage drop across resistor 67 to the value necessary to maintain the voltage across the load terminals substantially constant. When equilibrium has been established if the load voltage should increase, the potential at the junction of resistors 92 and 94 is raised, raising the base potential of transistor 79 relative to its emitter potential, increasing the current flow in transistor 79 and causing the voltage drop across resistor 67 to increase, thereby decreasing the voltage at the load. Should the load voltage decrease, the above circuit action is reversed, resulting in a decrease in the voltage drop across resistor 67 and increasing the voltage impressed across the load. The function of the protective diode 32, which is placed in the shunt with transistor 79 is to prevent reverse voltage from being placed across transistor 79 which would lead to its damage or destruction. In the absence of diode 32 if a short-circuit or overload is placed across the output terminals, capacitor 34 would thereby be placed directly across transistor 79 with a positive potential appearing at emitter 81 with respect to collector 82. Since the voltage across capacitor 34 might typically be quite large, such reverse voltage across transistor 79 could easily lead to its destruction. The protective diode 32 prevents the emitter 81 from going positive with respect to collector 82 and provides the discharge path for capacitor 34 in the event of overload or short-circuit conditions across the load terminals.

In other respects the system shown in FIG. 7 is similar to those shown in FIGS. 4 and 5. It is also possible to use a shunt regulator circuit similar to that shown in FIG. 7 in conjunction with a current monitoring configuration similar to that shown in FIG. 6.

Certain of the systems contemplated herein are particularly adapted to remote control and programmed operation. For example, the variable resistor 94 and also the autotransformer 100 or other regulating means may, if desired, be remotely located with respect to the remainder of the power supply system. For programming purposes, the element 94 may be a controllable electronic device such as a transistor or vacuum tube which is controlled by a command signal input. If desired, resistor 92 may be made the variable element, for direct or remote control.

It will be evident that the voltage drop in the series regulator 26 may be divided between two or more transistors or equivalent devices to reduce the maximum voltage which a single such device must be able to withstand. Also, any of the transistors 49, 52 and 64 or like devices may be replaced by cascaded groups of such devices where increased amplification or increased current handling capacity is desired. Where a plurality of devices are used in place of a single transistor 52, a single diode 32 or one group of connected diodes will suffice for the entire plurality of devices to be protected.

It will be understood that the constancy of the reference sources 88 and 112 may be further insured by using a reverse-current diode, commonly known as a Zener diode, in conjunction with a battery or other primary source.

While the invention affords particular advantages in the use of transistor circuitry in the series regulator and control circuits, the invention is not to be construed as being limited to the use of transistors, since other equivalent devices may be used instead.

Furthermore, the protective device 32 need not be a semiconductor diode although such a diode will usually be preferred for the purpose.

It will be evident that either or both of the power supply units 21, 22 may be entirely unregulated so that all regulation is accomplished by means of the fast acting regulating means comprising the series or shunt regulator and feedback circuit therefor, or either or both of the units 21, 22 may be provided with relatively slowly acting regulating means to supplement the action of the fast acting regulating means.

It will be evident that in practicing the invention three or more power supply units may be connected in series and that any or all of the units may be regulated. Furthermore, for control purposes any circuit condition of the load circuit may be sensed to provide a control signal which may be compared with any suitable parameter of the reference source.

While illustrative forms of apparatus and methods in accordance with the invention have been described and shown herein, it will be understood that numerous changes may be made without departing from the general principles and scope of the invention.

What is claimed is:

1. In a regulated power supply system, in combination, first and second power supply units, a regulator, means for connecting said regulator to produce a regulated output from said first power supply unit, means connecting said power supply unit in series with said regulated output and with a load circuit, and means responsive to the signal across said regulator and connected to said second power supply unit for controlling the output thereof, said regulator acting to control the output to the load.

2. In a regulated power supply system, in combination, a plurality of power supply units, a regulator, means connecting said regulator to produce a regulated output from one of said power supply units, means connecting the remaining power supply units in series with said regulated output and with a load circuit, and means responsive to the signal across said regulator and connected to at least one of the remaining power supply units for controlling the output thereof, said regulator acting to control the output to the load.

3. In a regulated power supply system, in combination, first and second power supply units and a series regulator connected serially with each other and with a load circuit, a reference source, relatively quickly acting means to compare a circuit condition of the load circuit with a parameter of said reference source, said comparing means serving to control said series regulator to maintain substantially constant the said condition of the load circuit, power input varying means connected to vary the power delivered by at least one of said power supply units, and relatively slowly acting means sensitive to changes in potential across said series regulator for controlling said power input varying means to limit variations in the potential across the said series regulator resulting from the regulating action thereof.

4. In a regulated power supply system, in combination, first and second power supply units and a series regulator connected in series with each other and with a load circuit, means sensitive to a change of condition in the load circuit to actuate said series regulator to maintain substantially constant the said condition in the load circuit, power varying means connected to vary the power delivered by at least one of said power supply units, means sensitive to a change in the operating condition of said series regulator for controlling said power varying means to limit said changes in the operating condition of the series regulator.

5. In a regulated power supply system, in combination, first and second power supply units and a series regulator connected in series with each other and with a load circuit, relatively rapidly acting means sensitive to a change of condition in the load circuit to actuate said series regulator to maintain substantially constant the said condition in the load circuit, power varying means connected to vary the power delivered by one of said power supply units, and relatively slowly acting means sensitive to a change in operating condition of said series regulator for controlling said power varying means to restore said series regulator to a normal operating condition following actuation of said series regulator.

6. In a regulated power supply system, in combination, first and second rectifying power supply units, a series regulator directly connected to one terminal of said first power supply unit, said series regulator being designed and adapted to withstand the full power output of said first power supply unit acting alone without material superposed power from said second power supply unit, means connecting said first and second power supply units and said series regulator in series relationship to each other and to a load circuit, said first and second power supply units being arranged in series aiding relationship with respect to the load circuit, the series combination of said first power supply unit and said series regulator having a substantially non-reactive output termination including a semiconductor diode poled in opposition to the output voltage of said first power supply unit, a first ripple-reducing capacitor connected across the output terminals of said first power supply unit ahead of said series regulator, a second ripple-reducing capacitor connected across the output terminals of said second power supply unit, a third ripple-reducing capacitor connected across the load circuit, said series regulator comprising a first transistor, control means comprising additional transistor means sensitive to variations of load condition to vary the voltage drop in said first transistor in such manner as to maintain said condition substantially constant, means for varying the power output of said second power supply unit, means responsive to the voltage drop in said first transistor for actuating said power-varying means in such manner as to maintain said voltge drop at a substantially constant average value, and a fuse serially connected between the terminal of the said second ripple-reducing capacitor nearer the load circuit and the terminal of the said third ripple-reducing capacitor nearer said second power supply unit, whereby the said series regulator is protected from overload during the time required for the fuse to break the circuit of the said second power supply unit and the said series regulator is operated with said substantially constant average value of voltage drop therein.

7. A power supply comprising a first source of voltage, a regulator, a second source of voltage having adjustable output, means serially connecting the regulator, the first source and the second source between output terminals, means connected to said output terminals and to said regulator for controlling the conductivity thereof in response to changes in the voltages across said terminals, and means connected between the regulator and said second source for controlling the voltage thereof in response to the voltage across said regulator.

8. A power supply comprising a first source of voltage and a regulator therefor, a second source of voltage, circuit means connected to said second source for varying the output thereof in response to applied signal, means serially connecting the regulator, the first source and the second source between output terminals, means connected to said output terminals and to said regulator for controlling the conductivity thereof in response to changes in the voltages across said terminals about a set value, and means connected between the regulator and said circuit means for controlling the output of said second supply in response to the voltage across said regulator.

9. A power supply comprising a plurality of sources of voltage, a regulator, a series circuit including one of said sources and said regulator, at least one of the remaining sources of voltage having an adjustable output, means serially connecting said remaining sources and said series circuit between output terminals, means connected to said output terminals and to said regulator for controlling the conductivity thereof in response to changes in the voltages across said terminals, and means connected between the regulator and said source having adjustable output for controlling the output thereof in response to the voltage across said regulator.

10. A circuit according to claim 9 wherein the end terminals of said series circuit are connected together by a unidirectional conduction device poled to be reverse biased by the voltage across said end terminals.

References Cited by the Examiner

UNITED STATES PATENTS

| | | | |
|---|---|---|---|
| 2,629,833 | 2/53 | Trent | 307—88.5 |
| 2,806,963 | 9/57 | Woll | 307—77 |
| 2,832,900 | 4/58 | Ford | 307—88.5 |
| 2,942,174 | 6/60 | Harrison | 323—22 |
| 2,965,833 | 12/60 | Jensen | 323—22 |
| 3,009,115 | 11/61 | Johnson | 323—22 |

LLOYD McCOLLUM, *Primary Examiner.*

MILTON O. HIRSHFIELD, *Examiner.*